(12) United States Patent
Tan et al.

(10) Patent No.: US 12,125,146 B1
(45) Date of Patent: *Oct. 22, 2024

(54) MULTIMODAL 3D DEEP LEARNING FUSION SYSTEM AND METHOD FOR REDUCING THE NEED OF 3D TRAINING DATASET OF 3D OBJECT TRACKING FOR ENTERPRISE DIGITAL TWIN MIXED REALITY

(71) Applicant: GridRaster, Inc., Mountain View, CA (US)

(72) Inventors: Yiyong Tan, Mountain View, CA (US); Bhaskar Banerjee, Mountain View, CA (US); Rishi Ranjan, Mountain View, CA (US)

(73) Assignee: GridRaster, Inc, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,091

(22) Filed: Jan. 13, 2022

Related U.S. Application Data

(63) Continuation of application No. 17/320,968, filed on May 14, 2021, now Pat. No. 11,250,637.

(51) Int. Cl.
| | |
|---|---|
| *G06T 19/00* | (2011.01) |
| *G06F 18/25* | (2023.01) |
| *G06N 3/045* | (2023.01) |
| *G06N 5/04* | (2023.01) |
| *G06N 20/10* | (2019.01) |

(52) U.S. Cl.
CPC ............ *G06T 19/006* (2013.01); *G06F 18/25* (2023.01); *G06N 3/045* (2023.01); *G06N 5/04* (2013.01); *G06N 20/10* (2019.01)

(58) Field of Classification Search
CPC ....... G06T 19/006; G06F 18/25; G06N 3/045; G06N 5/04; G06N 20/10
See application file for complete search history.

(56) References Cited

U.S. PATENT DOCUMENTS

| | | |
|---|---|---|
| 931,349 A | 8/1909 | Sletto |
| 6,160,808 A | 12/2000 | Maurya |
| 8,126,985 B1 | 2/2012 | Kandekar et al. |
| 9,677,840 B2 | 6/2017 | Rublowsky |
| 10,867,217 B1 | 12/2020 | Madden et al. |
| 2003/0065817 A1 | 4/2003 | Benchetrit |

(Continued)

OTHER PUBLICATIONS

Digital Twin Demo, PTC, 2020; https://www.youtube.com/watch?v=ERa8sN837h0 (Year: 2020).*

*Primary Examiner* — Jianxun Yang
(74) *Attorney, Agent, or Firm* — Manatt, Phelps & Phillip; Timothy W. Lohse

(57) ABSTRACT

A mixed reality (MR) system and method performs three dimensional (3D) tracking using 3D deep neural network structures in which multimodal fusion and simplified machine learning to only cluster label distribution (output of 3D deep neural network trained by generic 3D benchmark dataset) is used to reduce the training data requirements of to directly train a 3D deep neural network structures for non-generic user case. In one embodiment, multiple 3D deep neural network structures, such as PointCNN, 3D-Bonet, RandLA, etc., may be trained by different generic 3D benchmark datasets, such as ScanNet, ShapeNet, S3DIS, inadequate 3D training dataset, etc.

12 Claims, 7 Drawing Sheets

(56) References Cited

U.S. PATENT DOCUMENTS

| | | |
|---|---|---|
| 2005/0027870 A1 | 2/2005 | Trebes, Jr. |
| 2005/0047427 A1 | 3/2005 | Kashima |
| 2006/0050697 A1 | 3/2006 | Li |
| 2006/0080454 A1 | 4/2006 | Li |
| 2006/0098662 A1 | 5/2006 | Gupta |
| 2006/0159079 A1 | 7/2006 | Sachs |
| 2007/0130585 A1 | 6/2007 | Perret |
| 2007/0140171 A1 | 6/2007 | Balasubramanian |
| 2007/0245010 A1 | 10/2007 | Arn et al. |
| 2007/0247457 A1 | 10/2007 | Gustafsson |
| 2007/0273610 A1 | 11/2007 | Baillot |
| 2008/0162670 A1 | 7/2008 | Chapweske |
| 2009/0041120 A1 | 2/2009 | Yu |
| 2009/0046140 A1 | 2/2009 | Lashmet |
| 2009/0182815 A1 | 7/2009 | Czechowski, III |
| 2009/0196338 A1 | 8/2009 | Ali |
| 2009/0248872 A1 | 10/2009 | Luzzatti |
| 2009/0254659 A1 | 10/2009 | Li et al. |
| 2010/0225743 A1 | 9/2010 | Florencio |
| 2010/0253700 A1 | 10/2010 | Bergeron |
| 2011/0084983 A1 | 4/2011 | Demaine |
| 2011/0158311 A1 | 6/2011 | Abadir |
| 2012/0038739 A1 | 2/2012 | Welch |
| 2012/0106921 A1 | 5/2012 | Sasaki |
| 2013/0117377 A1 | 5/2013 | Miller |
| 2013/0286004 A1 | 10/2013 | McCulloch |
| 2016/0203646 A1 | 7/2016 | Nadler |
| 2017/0150122 A1 | 5/2017 | Cole |
| 2018/0157398 A1* | 6/2018 | Kaehler ................ G06N 20/00 |
| 2019/0052883 A1 | 2/2019 | Ikeda |
| 2020/0372709 A1* | 11/2020 | Ponjou Tasse ............ G06T 7/70 |
| 2021/0133850 A1* | 5/2021 | Ayush ...................... G06N 3/08 |

\* cited by examiner

MULTIMODAL 3D DEEP LEARNING FUSION SYSTEM AND METHOD FOR REDUCING THE NEED OF 3D TRAINING DATASET OF 3D OBJECT TRACKING FOR ENTERPRISE DIGITAL TWIN MIXED REALITY

RELATED APPLICATIONS

This application claims priority under 35 USC 120 and is a continuation of U.S. application Ser. No. 17/320,968, filed May 14, 2021 which is incorporated herein by reference.

FIELD

The disclosure relates to three dimensional (3D) object tracking using deep learning for 3D digital twin mixed reality and in particular to a multimodal 3D deep learning fusion system that reduces the need of 3D training dataset required by the 3D deep learning techniques.

BACKGROUND

The current product design process requires a lot of time and resources and typically takes multiple iterations. For example, for a car interior design process, the prevalent workflow is to do the initial design using CAD software on a PC, and then build a life scale model of the initial design using a combination of hand cut foam and 3D printed plastic models. The designer then assembles the foam and 3D printed plastic models inside a hollow car to evaluate the design. Based on review from the team and management, the designer makes changes in the design, and repeats the whole workflow process so that this conventional design process takes a lot of time and resources and requires several iterations to perform design work using this conventional technique.

Precise and persistent overlay of large, complex 3D models/digital-twins on their (complete or partial) real life counter parts on a mixed reality (MR) head mounted device (HMD), such as the Microsoft HoloLens, could be critical enterprise use cases for design, training, assembly, and manufacturing to be performed. In the design process using MR, the designer can render the 3D CAD model in full life-size scale, with high fidelity (millions of polygons and high quality texture) and place it precisely (with the tolerance of a few millimeters) at the desired location inside the same car as was done in the known design process. Using MR, the designer does not have to put together the physical "mock-up" using foam and 3D printed models. Furthermore, the MR world can be shared by multiple users simultaneously across multiple HMDs. The review and feedback can be incorporated as design changes in the CAD file and can be brought into the HMID in near real time that would save a lot of time and resources, and shorten the iterations significantly.

Using known MR processes for this design process results in two technical problems/challenges that have to be addressed. The two technical problems are: being able to render large complex models and scenes with 10s-100s of millions of polygons, at ~60 frames per second (FPS) with less than 20 ms motion-to-photon latency; and rendering at the correct physical location (with respect to both the real and virtual worlds) with the correct scale, and accurate pose with sub-10 mm accuracy. Note that these processes typically may involve millions of 3D voxels/points.

In general, to train a machine learning model (or a deep learning model), the complexity of the data being processed/analyzed must match the complexity of the machine learning model. Furthermore, to train a complicated deep learning model, a large amount of training data is required. In contrast, a simpler machine learning model is only able to process less complicated data, but thus requires a smaller amount of training data.

One way to address the above challenges for the data processing required for mixed reality systems is to use deep learning based 3D object tracking that has a complexity that matches the complexity of the data involved in the 3D object tracking. However, a technical problem is that these deep learning based 3D object tracking requires a large amount of training data to be comprehensive in order to match the complexity of the model. In the case of 3D object tracking for mixed reality, the data that could be used to train such a deep learning based 3D object tracking is typically confidential and private, so that it is often not possible to gather sufficient data to properly train the deep learning based 3D object tracking. Furthermore, manual labeling of that training data (if it could be obtained) would be difficult (especially for 3D dataset). A real world use case requires a more efficient approach, which is less dependent on the specific training dataset but can still do full 3D scene understanding of real world 3D scene leveraging existing general training models. Thus, it is desirable to provide a technical solution to this problem that reduces the 3D training data requirement as compared to the known deep learning based 3D object tracking and thus facilitates the 3D digital twin MR system and method and it is to this end that the disclosure is directed.

DETAILED DESCRIPTION OF ONE OR MORE EMBODIMENTS

Figure 1:
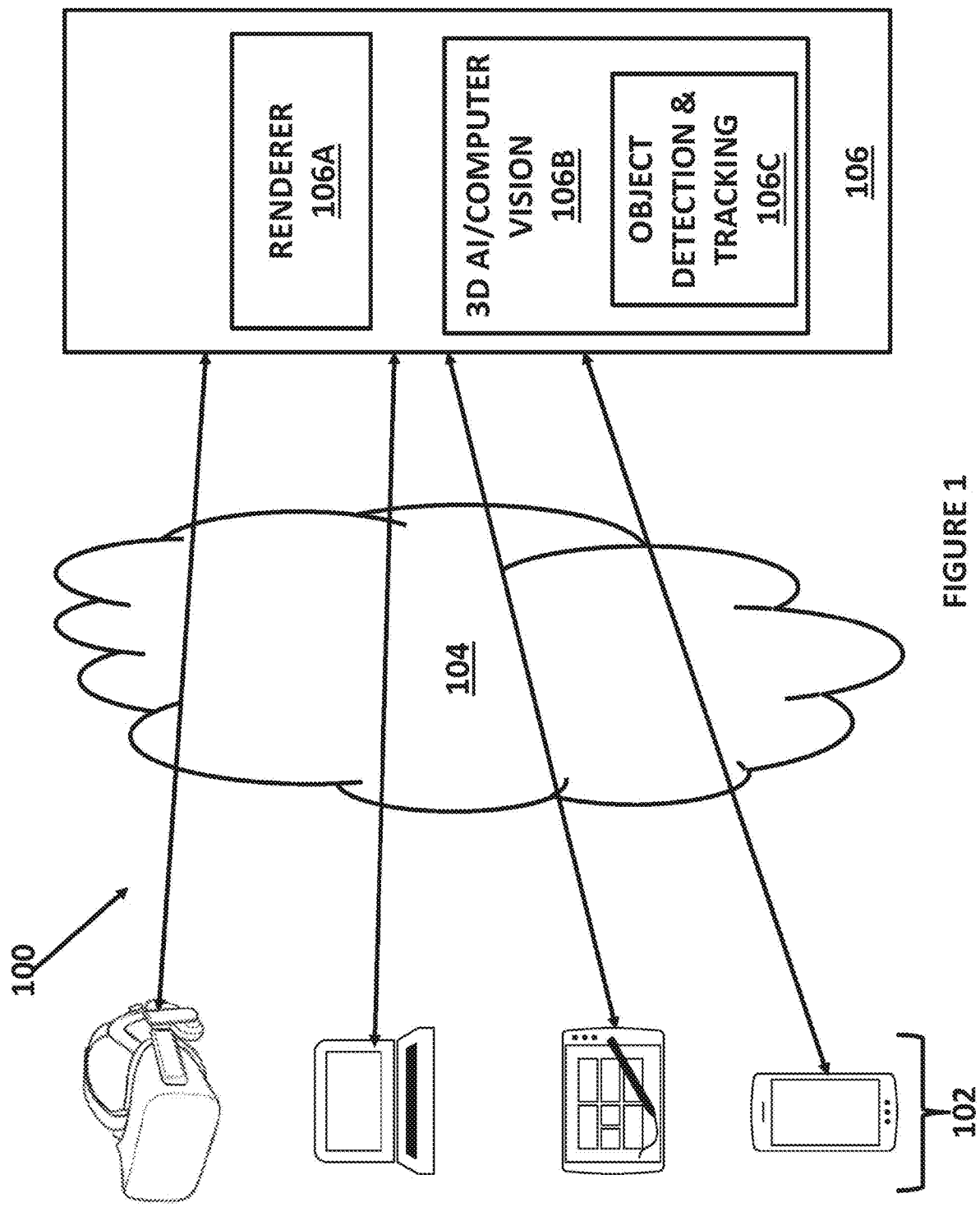
FIG. 1 illustrates a mixed reality system that may incorporate a 3D object tracking technique with reduced training data and a machine learning model.

The disclosure is particularly applicable to a design system that uses a mixed reality system with 3D object tracking that overcomes the above technical problems and limitations of existing deep learning systems. For the reduced training data and a simpler machine learning model as opposed to the deep learning system and it is in this context that the disclosure will be described. It will be appreciated, however, that the system and method has greater utility since the system may be implemented with different structures and/or different benchmark 3D datasets and/or different machine learning algorithms that are all within the scope of the disclosure. Furthermore, the mixed reality system with 3D object tracking with reduced training data may be used for any use case in which it is desirable to be able to understand the 3D scene and the digital twin model in one view.

The disclosed system and method is a multimodal system that utilizes multiple machine learning/artificial intelligence systems, such as a plurality of neural networks wherein each neural network has its own unique net topology structure which define different numerical feature behaviors when learning 3D scene features from a publicly available benchmark 3D training dataset. The distribution of features/scene context learned in a certain pretrained model can probe certain aspects in the high dimensional feature space of real-world objects/scene point clouds so that a pretrained model trained by general benchmark data can be used as a weak classifier for specific applications. Combining inference results of multiple pretrained models can yield a full spectrum of properties (similar to the "bag-of-visual words algorithm" in computer vision for image classification and the word/letter here is defined in the features extracted from generic 3D benchmark dataset by individual pretrained deep learning model, minimum two models for following fusion procedure) of the objects so that workflow can fuse multiple weak classifiers into a strong classifier. This uncertainty reduction concept is similar to sensor fusion I autonomous driving to understand the real driving environment, and can also be seen a painting objects/scenes by using multiple colors to maintain high fidelity of the real world).

In one embodiment, the disclosed system and method receives initial 3D data having a complexity of millions of 3D points. The system, using two or more machine learning systems that each generate a histogram based on public 3D training data (examples of which are set forth below) reduce the complexity of the initial 3D data to a vector of hundreds of values. The system then trains a simpler machine learning model (since the 3D data is now less complex—hundreds of histogram values vs. millions of 3D point values) that: 1) requires less training data; and 2) is able to solve the 3D object tracking problem with the complex initial 3D data (training data is often not available) and without using the deep learning model. In the disclosure below, a number of public benchmark 3D data sets are disclosed, but the system and method can be performed using different public datasets, public and private datasets or only private data sets that can train two or many deep learning models and then features extracted from two or many trained deep learning models allows the system to reduce the complexity of the initial 3D data.

FIG. 1 illustrates a mixed reality system 100 that may incorporate a 3D object tracking with reduced training data. The system 100 must have one or more computing devices 102 that each may store and execute a client application to communicate a connection over a communications path 104 to a backend system 106 that together provide the mixed reality experience. Thus, each computing device 102 may be a processor based device that has one or more displays and memory and can generate a mixed reality environment (images or videos) user interface based on data and commands communicated from the backend system 106. As shown in FIG. 1, the computing device 102 may be a headset, a laptop, a tablet computer and/or a smartphone device. In some cases, each of the computing devices may be the headset that is particularly suited for generating mixed reality user interfaces. For example, the headset typically has a separate display for each eye so that a different mixed reality stream may be displayed to each eye further promoting the 3D aspect of the mixed reality. Examples of the headset may be the Microsoft® HoloLens and the Oculus® Quest commercial products. In the case of the headset, it may have firmware/code that is executed by the processor of the headset while the other computing devices may have a mixed reality app that is executed by the processor. As shown in FIG. 1, each computing device 102 and the backend 106 may be remote from each other in this embodiment, but it is also possible to have a mixed reality system in which the computing device 102 and the backend 106 are integrated together. One aspect of the system 100 and the backend 106 is that object tracking occurs. In a typical system, this object tracking may be performed using a deep learning algorithm for the complex 3D data in which it is necessary to train the deep learning algorithm using a large amount of training data which is a technical problem that limits the utility of these typical systems. The system 100 and in particular the backend 106 may provide a technical solution to this problem by: 1) reducing the complexity of the 3D (millions of 3D points XYZ value to hundreds of values in a multidimensional vector) data using two or more machine learning models with benchmark 3D training data that each generate histograms and together generate a reduced set of training data; 2) training a simpler machine learning model using the reduced training data; and 3) using the trained machine learning model to solve the 3D object tracking problem.

As shown in FIG. 1, the backend 106 may further comprise a renderer element 106A and a three dimensional AI/computer vision element 106B that generates, renders and sends the mixed reality data to each computing device using known data transfer protocols. The three dimensional AI/computer vision element 106B may further comprise an object tracking element 106C that performs a technically complicated 3D object tracking process for the mixed reality data. The object tracking element 106C is improved by the below disclosed multimodal fusion process. In one embodiment, the object tracking component 106C includes an inference engine that performs the method 500 shown in FIGS. 5A and 5B to improve the object tracking and overlay registration of the object and the digital twin. The backend 106 may be implemented as a computer system, such as one or more server computers, blade servers, cloud computing systems, etc. that have at least one processor, memory and circuits to communicate and exchange data with each computing device 102. Each of the elements 106A-106C may be implemented as a hardware circuit or device or as a plurality of lines of computer code/instructions that are executed by the processor of the backend so that the processor is configure to perform the operations of each of the elements or each of the hardware circuits perform those operations.

Figure 2:
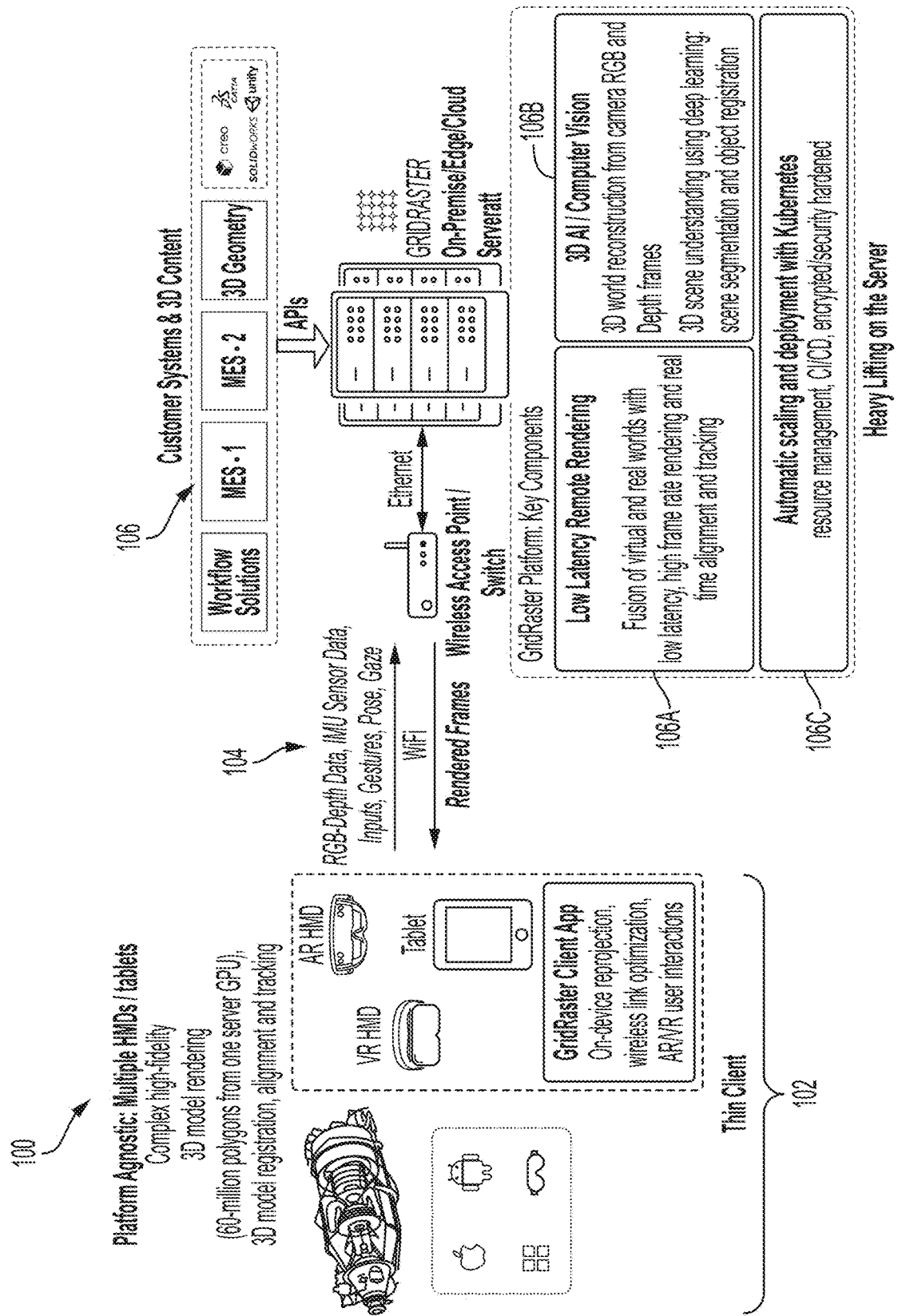
FIG. 2 illustrates an implementation of the mixed reality system in FIG. 1.

FIG. 2 illustrates an implementation of the mixed reality system 100 in FIG. 1 and shows more details of at least one computing device 102, the communication path 104 and the backend 106. Each computing device 102 may include a client application that performs functions and operations for on-device reprojection, wireless/wired link optimization and augmented reality (AR)/virtual reality (VR) user interactions. As part of the mixed reality, each computing device 102 performs complex high-fidelity 3D model rendering (such as 60-million polygons from one server GPU), performs 3D model registration to the underlying video and performs alignment of the model and the video and tracking. The alignment and tracking are part of the processes performed by a 3D object tracking process that is part of the server application.

During the mixed reality environment sessions, various data is exchanged over the communication path 104. Specifically, RGB-depth data (and XYZ data) of the video/ images, inertial measurement unit (IMU) sensor data, inputs, gestures, poses and gazes may be communicated from each computing device 102 to the backend while the backend 106 may communicate rendered frames for the mixed reality to each computing device 102 wherein the rendered frames are reprojected and customized to each computing device 102 based on the data provided from the computing device 102. In the example shown in FIG. 2, the communication path may use a WiFi network and Ethernet.

The backend 106 may use well known application programming interfaces (API) to receive data from various third party systems including workflow solutions, MES (Manufacturing execution system)-1, MES-2, 3D Geometry, etc. The renderer 106A may perform low latency remote rendering that fuses virtual and reality worlds with low latency, high frame rate rendering and real time alignment and tracking, The 3D AI/computer vision element 106B performs 3D world reconstruction from camera RGB data and depth (XYZ) frames. The 3D AI/computer vision element 106B also performs 3D scene understanding using deep learning scene segmentation and object registration which are also technical processes that are improved by the multimodal fusion as described below.

The system 100 shown in FIGS. 1-2 may be used to generate a mixed reality environment that may include 3D object tracking and overlaying a model. The precise overlay of a 3D model (known as the digital twin) with an actual object in a scene (see FIG. 4 below for an example) helps in industrial design, assembly, training, and also to catch any errors or defects in manufacturing. The system allows the user to also track the object(s) and enhance the rendering as the work progresses.

Most conventional on-device object tracking systems use a 2D image and/or marker based tracking that severely limits overlay accuracy in 3D because 2D tracking cannot estimate depth with high accuracy and consequently the scale, and the pose. This means with a conventional system, even though the user gets what looks like a good match when looking from one angle and/or position, the overlay loses alignment as you move around in six degrees of freedom (6DOF). Also the 3D object tracking, identification and its scale and orientation estimation—called object registration—is achieved, in most cases, computationally or using simple computer vision methods with standard training libraries (examples: Google MediaPipe, VisionLib). This works well for regular and/or smaller and simpler/generic objects such as hands, faces, cups, tables, chairs, wheels, regular geometry structures, etc. However for large, complex/uniquely designed objects in enterprise use cases, labeled training data (more so in 3D) is not readily available. This makes it difficult, if not impossible, to use the 2D image based tracking to align, overlay, and persistently track the object and fuse the rendered model with it in 3D. These are some of the technical problems with existing/conventional systems.

The system solves these technical problems by providing a technical solution. For example, for 3D object tracking, the system and method may perform a detailed 3D scene understanding following the workflow discussed below. Given the computation limitations of the computing devices 102, such as the HoloLens, the entire 3D processing is done on the backend 106, with discrete high end GPUs, where the color (RGB) and depth (D) data (RGBD) from the camera of the computing device 102 may be used to reconstruct a full 3D point cloud with complete texture mapping. A fine mesh is then generated using this 3D depth map and the relation between different parts of the scene is established. Both the RGB data and the depth data is used to segment the scene as discussed below.

Figure 3:
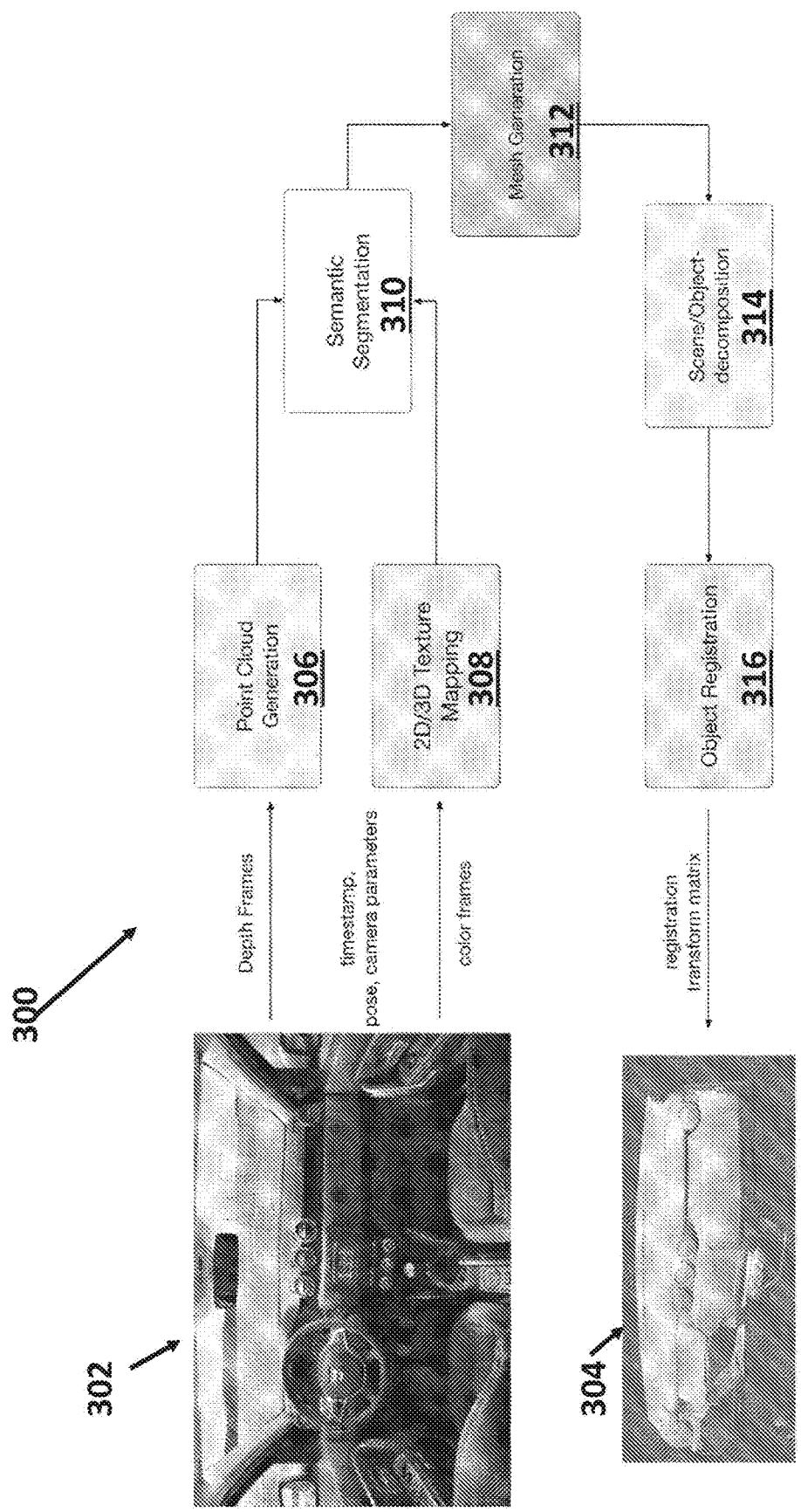
FIG. 3 illustrates a process for a mixed reality using the 3D object tracking with reduced training data.

In the example in FIG. 3, the object of interest is the car dashboard. The system 100 and its elements are able to isolate the dashboard from the rest of the scene 302 by identifying its features using our deep learning based inference engine (for example part of the object detector 106C in FIG. 1) that matches the object in the scene to the 3D model/digital-twin. The inference engine then automatically evaluates the object's distance and orientation and generates the 3D transform for the object registration and renders the model precisely overlaying on top of the object. The rendered model can actually track any movement of the person or the object itself, in real time.

Figure 4:
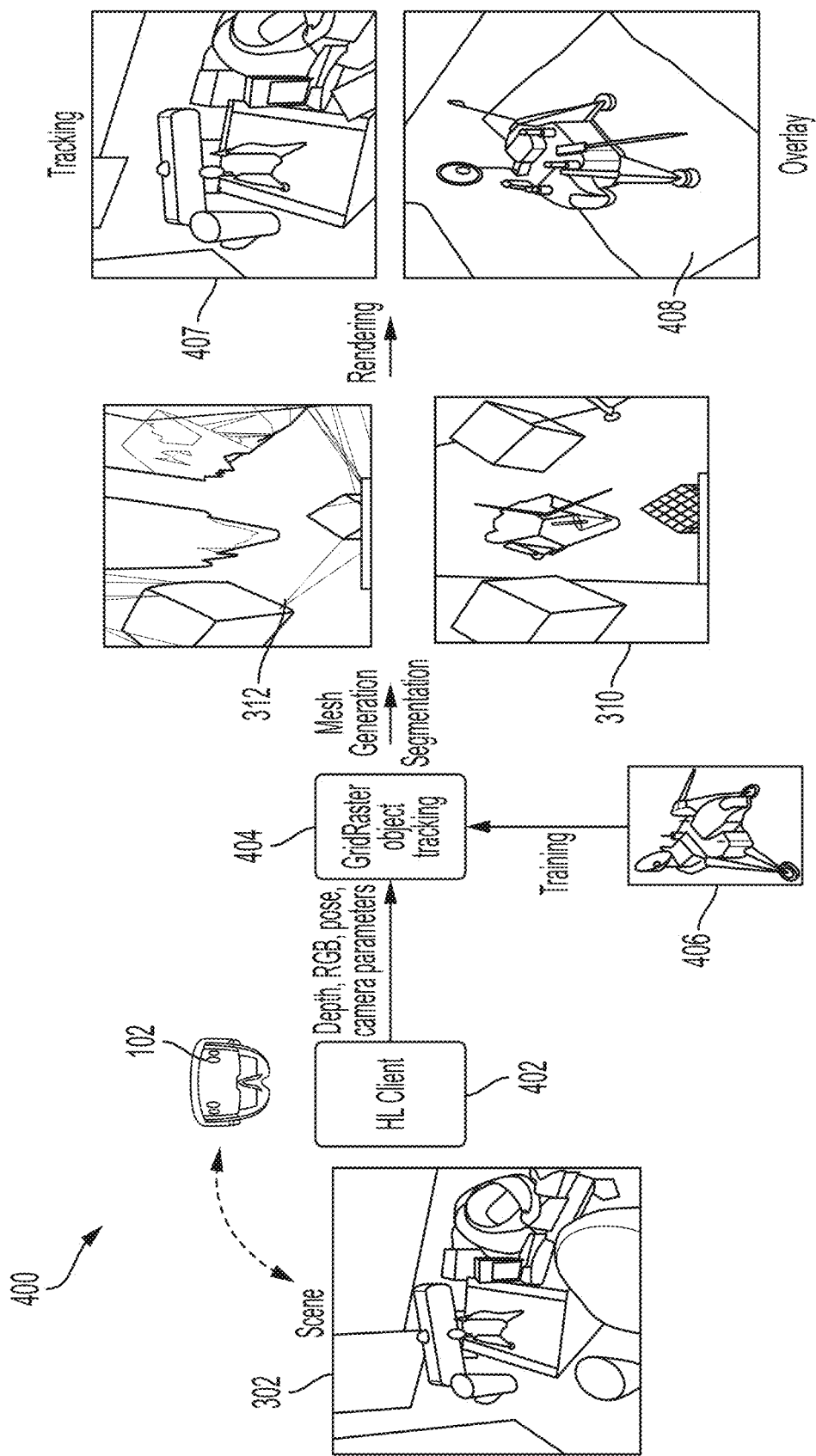
FIG. 4 illustrates further details of the mixed reality process in FIG. 3 with a real world user case: overlay of a CAD model and its 3D-printed real world object.

The system provides real time object tracking and overlaid rendering in a cluttered environment such as the lander scene shown in FIG. 4. The deep learning based 3D AI allows the system to identify 3D objects of arbitrary shape and size in various orientations with high accuracy in the 3D space. This approach is scalable with any arbitrary shape and is amenable to use in enterprise use cases requiring rendering overlay of complex 3D models and digital twins with their real world counterparts. This can also be scaled to register with partially completed structures with the complete 3D models, allowing for ongoing construction and assembly. The system and method achieve an accuracy of 1 mm-10 mm in the object registration and rendering using the system that illustrates the improvement over conventional systems that cannot achieve that accuracy. This approach to 3D object tracking will allow the system to truly fuse the real and virtual worlds, opening up many applications including but not limited to: training with work instructions, defect and error detection in construction and assembly, and 3D design and engineering with life size rendering and overlay.

FIG. 3 illustrates a process 300 for a mixed reality using reduced training data that starts with an image/video 302 of a real-life object, like a cockpit of an automobile, and a 3D model of the cockpit 304 that can be used in a mixed reality environment. As shown, depth frames may be generated from the image/video by the system and fed into a point cloud generation process 306. In addition, timestamps, pose, camera parameters and the captured image/video and color frames from the image/video are input to a 2D/3D texture mapping process 308. The outputs of the point cloud generation 306 and the texture mapping 308 may be input to a semantic segmentation process 310. The semantic segmentation is a process in the point cloud generated by which the digital image/video 302 may be partitioned into multiple segments wherein each segment is a set of 3D points of same label object with the goal to simplify the image/video 302 and locate an object in the current 3D scene 302. The output from the segmentation is fed into a mesh generation process 312 that generates the mesh for the 3D object 304 to be generated that represents the image/video 306. The results of the mesh generation 312 may be input to scene/object decomposition process 314 to isolate the real world counterpart of digital twin and an object registration process 316 to align 3D digital twin model 304 to real world counterpart (3D points cluster) of digital twin. This image and 3D processing is improved as a result of the multimodal fusion process and system.

FIG. 4 illustrates further details of the mixed reality technical process 400 in FIG. 3 that is improved due to the multimodal fusion that reduced the reliance on training data 406. In this example a scene 302 (that is an image) is captured by the computing device 102 that has a client 402 being executed by computing device 102. The computing device 102 and the client 402 passes data about the scene 302 including depth data of the scene, RGB data, pose data and camera parameters of the computing device onto the processes of the backend system that includes an object tracking process 404 that that may be part of the 3D object tracking 106C element. As shown in FIG. 4, this process 404 requires some training data 406 to train the object tracking process 404 that may be two or more machine learning processes and fusion. Also, this process 404 is a precursor to and affects the performance and quality of each of the segmentation process 310, mesh generation process 312, the rendering process, a tracking process 407 and an overlay process 408 as shown in FIG. 4. Thus, if one could reduce the requirement for training data for the object tracking process 404, it would improve each of the segmentation process 310, mesh generation process 312, the rendering process, the tracking process 407, and the overlay process 408 by making them faster and more efficient. As discussed below, the disclosed multimodal fusion reduces the necessity for training data for the process 404 and thus does improve each of the image processing/mixed reality processes shown in FIG. 4.

The object tracking process 404 output may be fed into the segmentation process 310 and mesh generation process 312 (examples of the output of which are shown in FIG. 4.) The outputs of these processes 310, 312 may be rendered (by the rendering process) and fed into the tracking process 407 (that maintains the tracking between the underlying scene 302 and the 3D model generated by the system) and overlay process 408 that overlays the 3D model onto the scene 302. The object tracking process 404 (and an improvement in that process) is important to be able to improve the tracking process 407 (since one first needs to identify the objects to track them) and to provide a quality overlay.

For 3D semantic segmentation, the method (shown in detail in FIGS. 5A, 5B and 6) uses multiple deep neural network structures (such as PointCNN, Bonet, RandLA, etc. in one embodiment) trained by different benchmark generic 3D dataset (ScanNet, ShapeNet, S3DIS, inadequate training dataset, etc.) to perform 3D semantic segmentation of 3D scene not seen by pretrained models. For each cluster of a point cloud, each pretrained model will label 3D objects in different distributions (histogram of labels which exist in generic benchmark dataset but does not exist in the current 3D scene). The labeled distribution can be used as the fingerprint of the 3D point clustering so that object/scene can be understood. Combining using different approaches, such as Gaussian mixture modeling (GMM), multilayer perceptron (MLP), support vector machine (SVM), random forest, k-nearest neighbors (KNN), distribution distance-based clustering and etc., these specific distributions of multiple pretrained models are merged into a stronger classifier. The major advantage of this approach is to minimize the labeled training data requirement for a specific use case and improve the generalizability of deep neural networks. Now, this method is described in more detail with reference to FIGS. 5A-5B.

Figure 5A:
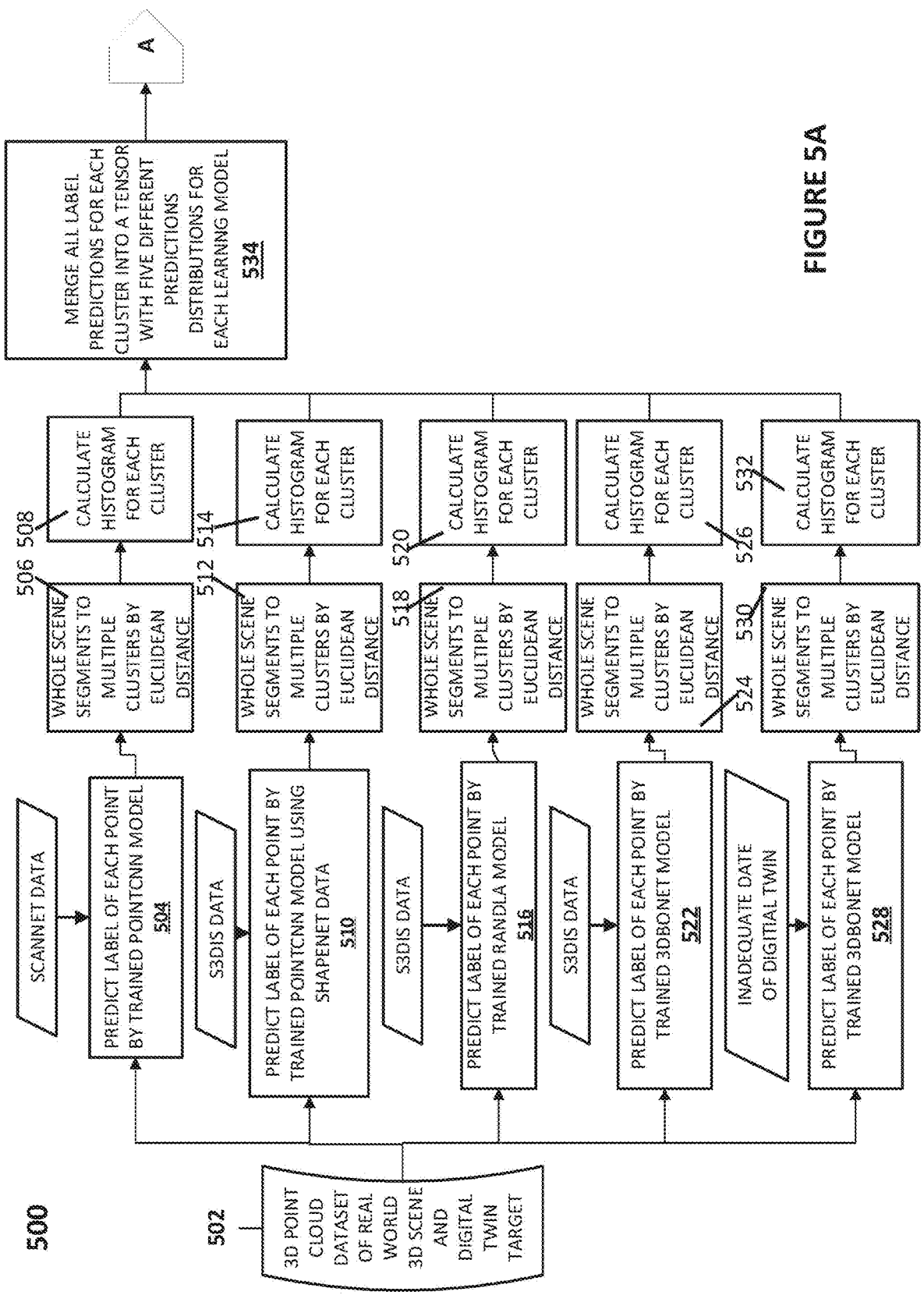
FIGS. 5A and 5B illustrate a process for 3D object tracking with reduced training data; and data.
Figure 5B:
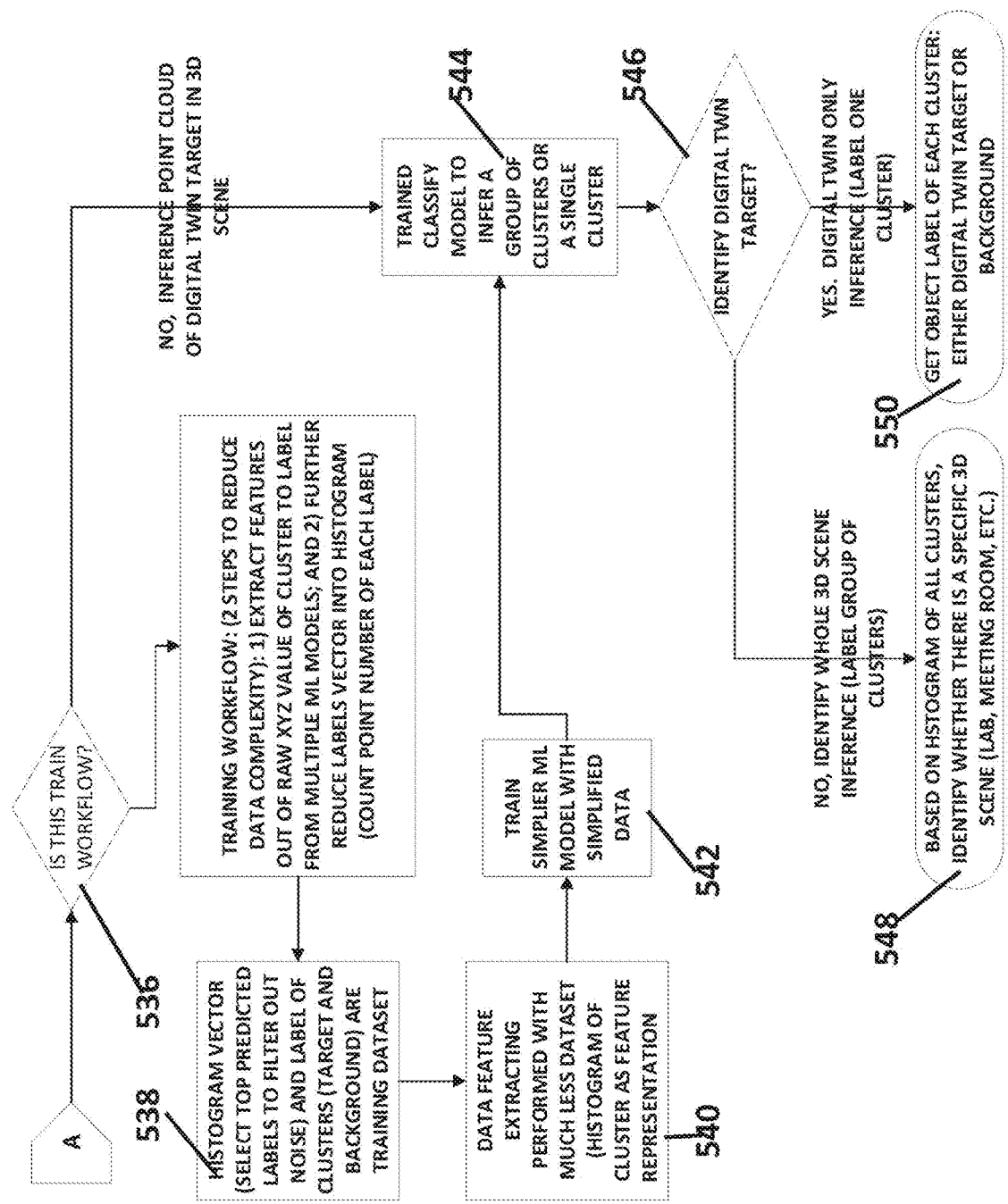
Figure 6:
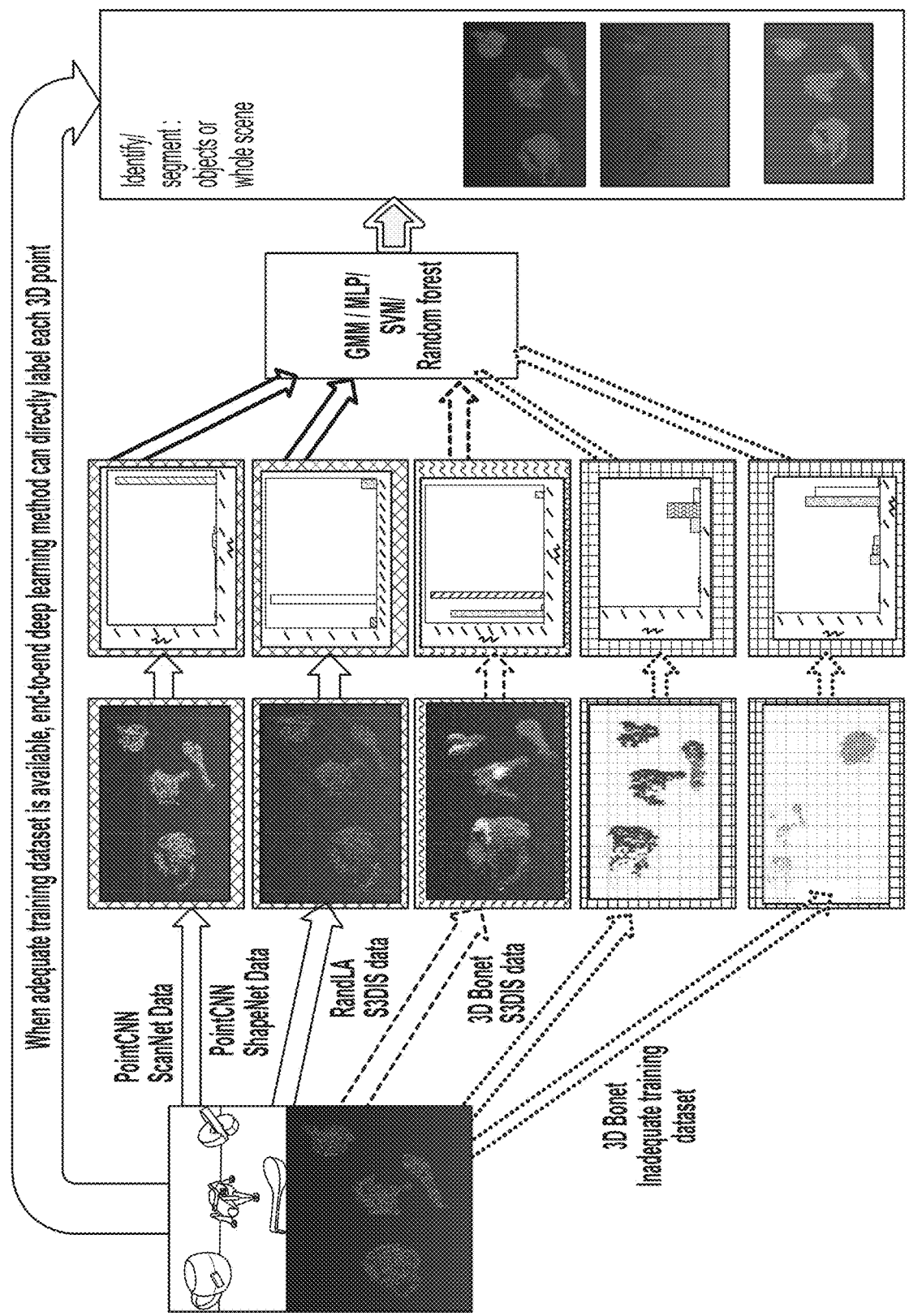
FIG. 6 illustrates an example of the 3D object tracking with reduced training.

FIGS. 5A-5B illustrate a process 500 for 3D object tracking with reduced training data and FIG. 6 illustrates an example of the 3D object tracking with reduced training data. The method 500 may be performed by the object detector 106C in FIG. 1 and the mixed reality system described above may also be implemented using other systems in which it is desirable to improve image processing and 3D object tracking as part of a larger system and method. In one embodiment, the processes of the method 500 shown in FIGS. 5A and 5B are each implemented as a plurality of instructions/code that are executed by a processor of a computer system wherein the instructions/code configure the process to perform the below described processes.

In one example use case, the method is being used to object tracking for a scene and digital twin target as described above and the method may receive 3D point cloud dataset of a real world 3D scene including a digital twin target data (502), with examples of that data shown in FIG. 4. This data may be collectively called "input data" in the description below. The input data may be input to a plurality of machine learning process 504. 520, 516, 522, 528 (multimodal fusion). Each machine learning process may be pre-trained with data so that each machine learning process is pre-trained and thus does not require the normal training process. For example, a deep learning model (such as a known PointCNN model) (504) may be pre-trained with an adequate benchmark generic dataset (such as a known ScanNet Data). The pre-trained machine learning process 504 may then predict labels of each 3D point of the current 3D scene using the trained model. The method may then perform the whole scene segmentation into multiple clusters by Euclidean distance (506) and then calculate a histogram for each cluster (508). An example of these processes for this pretrained machine learning process are shown in FIG. 6 (See top PointCNN process) with the segmentation and then the histogram.

A second machine learning process (such as a known PointCNN model) (510) may be trained with data (such as a known S3DIS dataset). The pre-trained machine learning process 510 (pre-trained with a different data set) may then predict labels of each point using the trained model. The method may then perform the whole scene segmentation into multiple clusters by Euclidean distance (512) and then calculate a histogram for each cluster (514). An example of these processes for this pre-trained machine learning process are shown in FIG. 6 (See second PointCNN process pre-trained with the ShapeNet benchmark data) with the segmentation and then the histogram.

For a deep learning model (like PointCNN), if different training dataset (different set of 3D point cloud and the label of all 3D point in point cloud) are used to train a deep neural network (DNN) model, it results in different weight inside each node of neural network thus changing the inference behavior of the model (literally different training data create different flavor/behavior of same neural network). For example, different training data can guide the DNN model to emphasize extracting different aspect/information of 3D point cloud so that the differently trained DNNs become sensitive to cover multiple aspects (color, geometry curvature, structure semantic relationship, XYZ spatial density) of objects.

A third machine learning process (such as the known RandLA model) (516) may be trained with data (such as a known S3DIS dataset). The pre-trained machine learning process 516 (pre-trained with a different data set) may then predict labels of each point using the trained model. The method may then perform the whole scene segment to multiple clusters by Euclidean distance (518) and then calculate a histogram for each cluster (520). An example of these processes for this pre-trained machine learning process is shown in FIG. 6 (See RandLA process pre-trained with the S3DIS data) with the segmentation and then the histogram.

A fourth and fifth machine learning process (such as the known 3D Bonet model for both processes) (522, 528) may be trained with data (such as a known S3DIS dataset and inadequate data set, such as inadequate data of the digital twin target). An inadequate dataset has data whose complexity is less complicated than the model's complexity. The deep learning model only needs to use part of its neural nodes to predict (more like memorize) the correct label for all training dataset. In this case, deep learning model only need to do a memory/projection to finish training. This unsuccessful training is called overfitting, and even the deep learning model can get 100% accuracy in training data, for any unseen real world datasets, the accuracy will be much worse and not meet product quality, so the deep learning model will be practically useless.

Each of these pre-trained machine learning processes 522, 528 (each pre-trained with a different data set) may then predict labels of each point using the pre-trained model. The method may then perform the whole scene segment to multiple clusters by Euclidean distance (524, 530) for each model and then calculate a histogram for each cluster (526, 532). An example of these processes for this pre-trained machine learning processes is shown in FIG. 6 (See two 3D Bonet process pre-trained with the S3DIS data and the inadequate data) with the segmentation and then the histogram. Although FIGS. 5A, 5B and 6 show three learning models being trained by four different training data sets to get best results, the method may be performed with fewer or more learning models and training data sets for certain user cases. The minimum requirement of multimodal fusion (>=2 models) described here is two models and one 3D benchmark training data. The minimum requirement is for simple 3D digital twin use cases which are majorly composed of geometric primitives and precision/accuracy requirements are low.

The method may then merge the label predictions for all of the pretrained models of the clusters into a tensor. For each cluster, the method thus has (as shown in FIG. 6) a different prediction distribution (histogram) for each model (534). As discussed above, each of the histograms is sensitive to a different feature of the 3D data (color, geometry curvature, graph connection structure, semantic relationship, XYZ spatial density, normal vector estimation, etc.). With diverse feature information collected by different models, the system has a much better holistic understanding of target object which enhances the confidence of the label prediction generated by trained DNN model and also abstracts real world objects into a simplified representation with much reduced dimensions and complexity. Therefore, this reduced representation makes it possible to use simpler machine learning model to segment with much less non generic training datasets.

If, based on the accuracy of the merged label data, more training is needed, the method may perform two processes to reduce data complexity so that the method can minimize the need for training data of the digital twin target. The two processes may be: 1) extract features out of raw XYZ and RGB values of the clusters to label from the multiple models and different model will label segmented digital twin point clusters as different composition of multiple 3D bench mark labels; and 2) further reduce labels vector into histogram and count point number of each 3D bench mark label of the digital twin point clusters segmented out. In more detail, the processes may select top predicted labels (label existing in 3D benchmark dataset) to filter out noise and the reduced label (target and background) of the clusters as the training dataset (538) and perform the two step data feature extraction with the much smaller training dataset as the input is already extracted features from pretrained models trained by 3D benchmark dataset (540).

The method may then train simpler machine learning models (542) using the features which are extracted by complex deep learning models as is shown in FIG. 6. In one embodiment, the simpler machine learning models may include the known Gaussian mixture modeling (GMM), multilayer perceptron (MLP), support vector machine (SVM) and random Forest. In addition to the training, the method may use the trained simpler machine learning models to infer a group of clusters or a single cluster (544). If to label a single cluster, the trained simpler machine learning model can identify the digital twin target or background. If to label a group of clusters, the method identifies whether there is a specific 3D scene (a lab, a meeting room, etc.) by using the histogram of all of the clusters (548) to determine the label of the scene. If the use case is to identify the digital twin target is identified, the method retrieves the object label of each cluster (either the digital twin target or background) (550). The results of these processes are shown in FIG. 6 that shows, for each DNN mentioned in FIGS. 5A-5B, the visual results for each DNN from which the histogram is generated.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, edge computing devices, cloud computing platform, and other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices and cloud services.

The software, circuitry and components herein may also include and/or utilize one or more types of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can be accessed by computing component. Communication media may comprise computer readable instructions, data structures, program modules and/or other components. Further, communication media may include wired media such as a wired network or direct-wired connections; however no media of any such type herein includes transitory media. Combinations of any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (Single instruction, multiple data—SIMD—instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A 3D digital twin mixed reality environment generating method comprising:
    tracking, on a backend computer system having a processor, a digital twin of an actual object in a 3D scene that overlays the actual object to generate a mixed reality environment having the digital twin overlaying the actual object in the mixed reality environment;
    generating the mixed reality environment including the 3D scene and the digital twin; and
    wherein tracking the digital twin to the actual object in the 3D scene further comprises receiving, at the backend computer system having the processor and instructions wherein the processor executes the instructions, data about the 3D scene and the digital twin; training, on the backend computer system, at least two deep learning models using at least one 3D benchmark training data set; predicting, on the backend computer system, at least two sets of labels for the 3D scene date using the trained at least two deep learning models; determining a first histogram for each trained deep learning model; merging, on the backend computer system, the at least two sets of labels generated from the trained deep learning models; training a machine learning model using the merged sets of labels from the trained deep learning models which reduce a complexity of a point cloud of the 3D scene by representing raw RGB and XYZ data of the point cloud in a histogram/distribution of labels of each 3D point; and inferring, on the backend computer system, the digital twin for the actual object that overlays the actual object in the mixed reality environment using the trained machine learning model.

2. The method of claim 1, wherein the machine learning model is selected from one of one or more clustering algorithms.

3. The method of claim 2, wherein the machine learning model is one of Gaussian mixture modeling (GMM), multilayer perceptron (MLP), support vector machine (SVM), random forest, k-nearest neighbors (KNN) and distribution distance based clustering.

4. A mixed reality system, comprising:
    a 3D scene having one or more actual objects in the 3D scene and one or more digital twins of the one or more 3D scene actual objects;
    a headset;
    a backend computer system having a processor connected to the headset that generates the mixed reality environment including the 3D scene with the one or more actual objects and the one or more digital twins for the one or more actual objects wherein each digital twin overlays the corresponding actual object in the mixed reality environment and tracks each of the one or more digital twins for each of one or more actual objects in the mixed reality environment, wherein the tracking of each of the one or more digital twins to the one or more actual objects in the 3D scene is performed by the processor executing instructions being configured to:
        receive data about the 3D scene and a particular digital twin of the one or more digital twins;
        train at least two deep learning models using at least one 3D benchmark training data sets;
        predict at least one set of labels for the 3D scene using the trained at least two deep learning models to generate at least two sets of labels, to determine a histogram for each trained deep learning model and to merge the at least two sets of labels;
        train a machine learning model using the merged sets of labels from the trained deep learning models; and
        infer the particular digital twin of the actual object that overlays the actual object in the mixed reality environment using the trained machine learning model.

5. The system of claim 4, wherein the machine learning model is selected from one of one or more clustering algorithms.

6. The mixed reality system of claim 4, wherein the machine learning model is one of Gaussian mixture modeling (GMM), multilayer perceptron (MLP), support vector machine (SVM), random forest, k-nearest neighbors (KNN) and distribution distance based clustering.

7. A system, comprising:
    a computer system having a processor and memory and a plurality of lines of instructions executed by the processor that configure the processor to:
        receive data about a 3D scene having an actual object and a digital twin target of the actual object in the 3D scene that overlays the actual object in a mixed reality environment;
        train at least two deep learning models using at least one 3D benchmark training data sets;
        predict at least two sets of labels for the 3D scene using the trained at least two deep learning models and determining a histogram for each trained deep learning model;
        merge the at least two sets of predicted labels;
        train a machine learning model using the merged sets of predicted labels from the trained deep learning models; and
        identify the digital twin target that overlays the actual object in the 3D scene using the trained machine learning model which requires much less data than the at least two deep learning models.

8. The system of claim 7, wherein the machine learning model is selected from one of one or more clustering algorithms.

9. The system of claim 7, wherein the machine learning model is one of Gaussian mixture modeling (GMM), multilayer perceptron (MLP), support vector machine (SVM), random forest, k-nearest neighbors (KNN) and distribution distance based clustering.

10. A method, comprising:
    receiving, at a computer system having a processor and instructions wherein the processor executes the instructions, data about a 3D scene having an actual object and a digital twin target of the actual object that overlays the actual object in a mixed reality environment;
    training, on the computer system, at least two deep learning models using at least one 3D benchmark training data set;
    predicting, on the computer system, at least two sets of labels for the 3D scene using the trained at least two deep learning models and determining a histogram for each trained learning model;
    merging, on the computer system, the at least two sets of labels;

training a machine learning model using the merged at least two sets of labels from the trained deep learning models; and identifying, on the computer system, the digital twin target for the actual object that overlays the actual object in the mixed reality environment using the trained machine learning model that requires much less data than the at least two deep learning models.

11. The method of claim 10, wherein the machine learning model is selected from one of one or more clustering algorithms.

12. The method of claim 10, wherein the machine learning model is one of Gaussian mixture modeling (GMM), multilayer perceptron (MLP), support vector machine (SVM), random forest, k-nearest neighbors (KNN) and distribution distance based clustering.

\* \* \* \* \*